United States Patent
Singh et al.

(10) Patent No.: US 10,932,115 B2
(45) Date of Patent: Feb. 23, 2021

(54) EMERGENCY CALL SETUP ENHANCEMENTS

(71) Applicant: Intel Corporation, Santa Clara, CA (US)

(72) Inventors: Ashish Singh, Munich (DE); Sushant Kumar, Munich (DE); Prasad Ashtekar, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/489,357

(22) PCT Filed: Mar. 14, 2018

(86) PCT No.: PCT/US2018/022297
§ 371 (c)(1),
(2) Date: Aug. 28, 2019

(87) PCT Pub. No.: WO2018/182972
PCT Pub. Date: Oct. 4, 2018

(65) Prior Publication Data
US 2020/0015061 A1   Jan. 9, 2020

(30) Foreign Application Priority Data
Mar. 30, 2017   (DE) ............ 10 2017 106 858.9

(51) Int. Cl.
*H04B 17/336*   (2015.01)
*H04W 4/90*   (2018.01)
(Continued)

(52) U.S. Cl.
CPC ............ *H04W 4/90* (2018.02); *H04B 7/0413* (2013.01); *H04B 7/0626* (2013.01);
(Continued)

(58) Field of Classification Search
CPC ..... H04L 5/001; H04L 5/0064; H04L 5/0087; H04L 5/0096; H04L 5/0048;
(Continued)

(56) References Cited

U.S. PATENT DOCUMENTS

2006/0094415 A1   5/2006   Veron
2008/0102896 A1*  5/2008   Wang .................... H04W 36/34
                                                                   455/560
(Continued)

FOREIGN PATENT DOCUMENTS

KR   1020070074609 A   7/2007

OTHER PUBLICATIONS

German Office Action based on Application No. 10 2017 106 858.9 (7 pages) dated Oct. 12, 2017 (for reference purpose only).
(Continued)

*Primary Examiner* — Fred A Casca
(74) *Attorney, Agent, or Firm* — Viering, Jentschura & Partner (57) ABSTRACT

In accordance with various embodiments, an electron beam evaporator can comprise the following: a tubular target; an electron beam gun for producing at least one vapor source on a removal surface of the tubular target by means of an electron beam; wherein the removal surface is a ring-shaped axial end surface or a surface of the tubular target that extends conically or in a curved fashion from the free end edge.

18 Claims, 8 Drawing Sheets

(51) Int. Cl.
*H04W 4/029* (2018.01)
*H04W 76/50* (2018.01)
*H04B 7/0413* (2017.01)
*H04B 7/06* (2006.01)
*H04J 3/16* (2006.01)
*H04J 11/00* (2006.01)
*H04L 5/00* (2006.01)
*H04L 29/08* (2006.01)
*H04W 76/27* (2018.01)
*H04B 7/0456* (2017.01)
*H04W 84/04* (2009.01)

(52) U.S. Cl.
CPC .......... *H04B 17/336* (2015.01); *H04J 3/1694* (2013.01); *H04J 11/00* (2013.01); *H04J 11/005* (2013.01); *H04L 5/001* (2013.01); *H04L 5/0048* (2013.01); *H04L 5/0098* (2013.01); *H04L 29/08* (2013.01); *H04W 4/029* (2018.02); *H04W 76/50* (2018.02); *H04B 7/0486* (2013.01); *H04J 2211/001* (2013.01); *H04W 76/27* (2018.02); *H04W 84/042* (2013.01); *Y02D 30/70* (2020.08)

(58) Field of Classification Search
CPC .. H04L 5/0098; H04L 29/08; H04W 72/0453; H04W 84/12; H04W 4/90; H04W 84/042; H04W 60/00; H04W 76/34; H04W 4/029; H04W 76/50; H04W 76/27; H04B 7/0413; H04B 7/0626; H04B 1/10; H04B 7/04; H04B 17/336; H04B 7/0486; H04J 11/00; H04J 3/1694; H04J 2211/001; H04J 11/005; Y02D 70/1262; Y02D 70/126; Y02D 30/70
See application file for complete search history.

(56) References Cited

U.S. PATENT DOCUMENTS

| | | | | |
|---|---|---|---|---|
| 2012/0252397 | A1* | 10/2012 | Kumar | H04W 48/16 455/404.1 |
| 2013/0272129 | A1* | 10/2013 | Prakash | H04W 28/0268 370/235 |
| 2015/0327269 | A1* | 11/2015 | Kim | H04W 88/02 370/329 |
| 2016/0183260 | A1 | 6/2016 | Sriram et al. | |
| 2016/0192430 | A1* | 6/2016 | Sahoo | H04W 76/20 455/422.1 |
| 2016/0242072 | A1* | 8/2016 | Hsu | H04W 28/06 |
| 2016/0345193 | A1* | 11/2016 | Takahashi | G01S 19/34 |
| 2018/0227902 | A1* | 8/2018 | Gholmieh | H04B 7/0413 |

OTHER PUBLICATIONS

International Search Report based on Application No. PCT/US2018/022297 (14 pages) dated Jun. 27, 2018 (for reference purpose only).

* cited by examiner

EMERGENCY CALL SETUP ENHANCEMENTS

CROSS-REFERENCE TO RELATED APPLICATIONS

This is a National Phase of PCT Application PCT/US2018/022297, filed on Mar. 14, 2018, which claims priority to German Patent Application Ser. No. 10 2017 106 858.9, which was filed Mar. 30, 2017, and is incorporated herein by reference in its entirety.

TECHNICAL FIELD

Various embodiments relate generally to communications with a radio access network.

BACKGROUND

When placing an emergency call, the mobile device transmits capability information to the network if requested by network in the call establishment procedure. This may include carrier aggregation information, which is both lengthy and may be of limited usefulness in certain radio access technology environments. Emergency calls are generally given a limited duration to establish a connection, which can be hampered by a lengthy data transmission for call establishment.

SUMMARY

Disclosed herein are a method and device for establishing an emergency call by omitting carrier aggregation information in the connection setup procedure. Because the carrier aggregation information can be quite lengthy, its elimination may substantially reduce the volume of data required to be transmitted for establishment of an emergency call. This reduction of data increases the likelihood of transmission within a given call initiation timer. The reduced data can either result in successful establishment of emergency calls that would have otherwise failed during transmission of carrier aggregation information, or generally in the more rapid establishment of emergency calls.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which.

DESCRIPTION

The following detailed description refers to the accompanying drawings that show, by way of illustration, specific details and aspects in which the Disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB ("Enb"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short-Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Emergency calls are mandated by various radio access technology standards and may be generally understood in this context as a call which can be placed on a network to which a mobile device would not otherwise have access. This can occur when a subscriber of a first network cannot access the first network, whether due to geography, signal strength, overloading, or otherwise. Under this circumstance, the subscriber may be permitted to place an emergency call on a second network, for which this subscriber otherwise has no subscription or access. This permits, inter alia, calls to emergency services such as 911, 112, or otherwise, even where the network corresponding to a mobile device's subscriber identification module is not available.

An emergency call generally occurs on a legacy network due to limited support of emergency call in LTE network, even where the subscriber may otherwise operate primarily on a network of the latest generation. Under some circumstances, the alternative network may be configured such that the establishment of an emergency call is difficult or impossible. For instance, this may be the case where a mobile device supporting LTE carrier aggregation attempts to place an emergency call through a legacy network according to the Third Generation ("3G") radio access network standards. In establishing an emergency call, a carrier aggregation enabled mobile device will typically communicate to the network its carrier aggregation capabilities during the call establishment procedure. The carrier aggregation information may be of substantial length, depending on the amount of supported carriers and the supported combinations of same. Due to the volume of the carrier aggregation data, it may be difficult for the mobile device to transmit the entire UE capability information including this carrier aggregation data to the network during the time permitted to establish a call. Where the call is not established within the allotted time, the network will terminate the call establishment procedure, and the attempt to place an emergency call will fail. This difficulty is further complicated by the generalized use of comparatively slow transport channels for emergency calls. Thus, a mobile device seeking to establish an emergency call is faced with the challenge of transmitting a large volume of data on a comparatively slow channel within a limited time. The methods, devices, circuits, means and otherwise contained herein describe reducing this volume of data to be transmitted, such that the call can be established within the time allotted by the network, or alternatively to generally increase the speed of establishing an emergency call.

Figure 1:
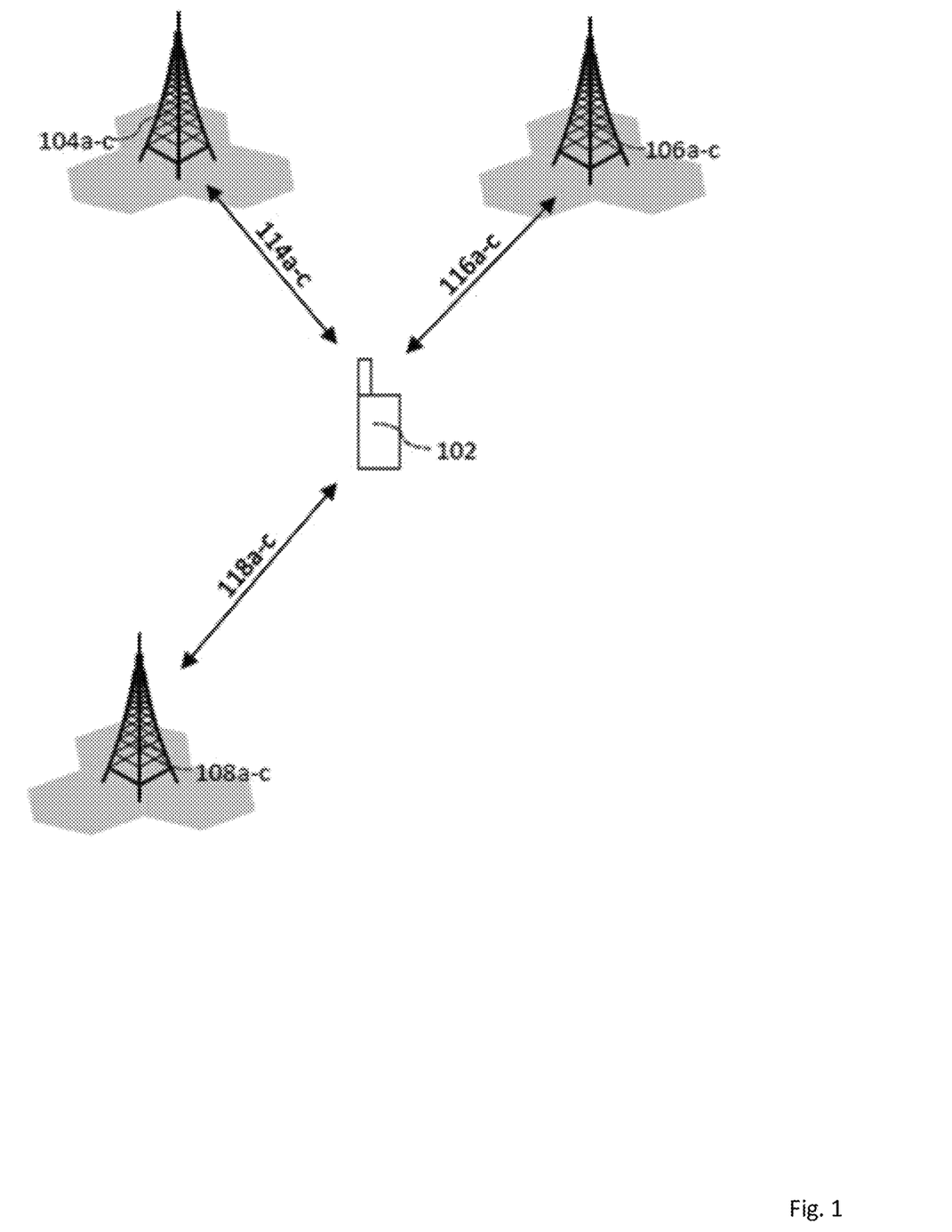
FIG. 1 shows an exemplary mobile device performing a cell search operation.

FIG. 1 shows an exemplary scenario in which mobile terminal 102 is located proximate to base stations 104, 106, and 108. Each of base stations 104-108 may be sectorized (e.g. with sectorized antenna systems) and accordingly composed of multiple "sectors" or "cells", such as cells 104a, 104b, and 104c for base station 104, cells 106a, 106b, and 106c for base station 106, and cells 108a, 108b, and 108c for base station 108. The wireless channels 114a-114c, 116a-116c, and 118a-118c may represent the discrete wireless channels between each of respective cells 104a-104c, 106a-106c, and 108a-108c.

Figure 2:
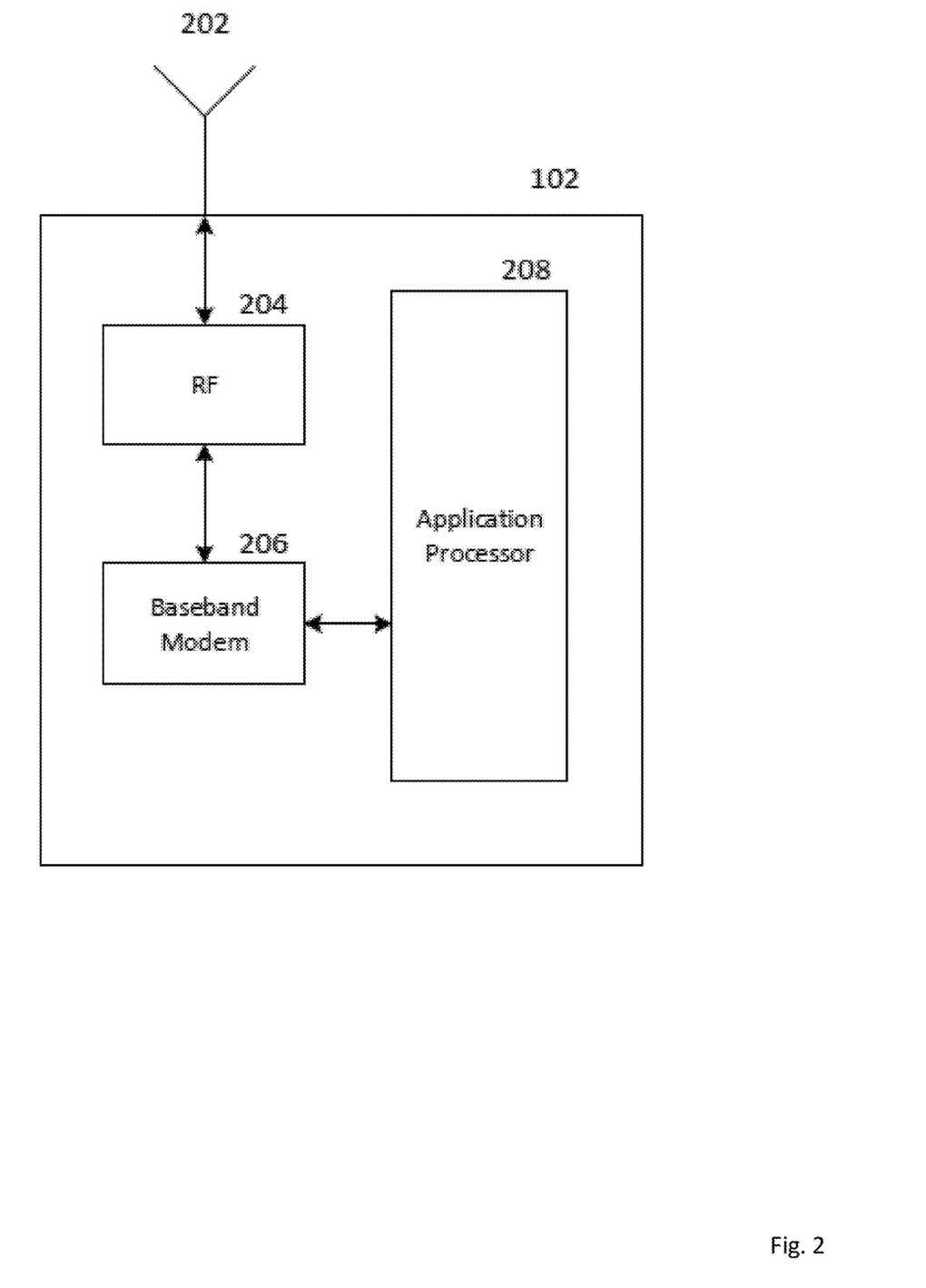
FIG. 2 shows an exemplary mobile device.

FIG. 2 shows an internal configuration of mobile terminal 102. As shown in FIG. 2, mobile terminal 102 may include antenna system 202, RF transceiver 204, baseband modem 206, and application processor 208. Mobile terminal 102 may have one or more additional components not explicitly depicted in FIG. 2, such as additional hardware, software, or firmware elements including processors/microprocessors, controllers/microcontrollers, memory, other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) ("SIM") etc.

In an abridged overview of the operation of mobile terminal 102, mobile terminal 102 may be configured to receive and/or transmit wireless signals according to one or more wireless access protocols or RATs, including any one or combination of 5G, LTE, 4G, 3G, WLAN, Wi-Fi, UMTS, GSM, Bluetooth, CDMA, WCDMA, etc. The RAT capabilities of mobile terminal 102 may be determined by one or more SIMS included in mobile terminal 102 (not explicitly shown in FIG. 2). It is appreciated that separate components may be provided for each distinct type of compatible wireless signals, such as a dedicated 5G antenna, 5G RF transceiver, and dedicated 5G baseband modem for 5G reception and transmission, a dedicated UMTS antenna, UMTS RF transceiver and UMTS baseband modem, a dedicated Wi-Fi antenna, Wi-Fi RF transceiver, and Wi-Fi baseband modem for Wi-Fi reception and transmission, etc., in which case antenna 202, RF transceiver 204, and baseband modem 206 may each respectively be an antenna system, RF transceiver system, and a baseband modem system composed of the individual dedicated components. Alternatively, one or more components of mobile terminal 102 may be shared between different wireless access protocols, such as e.g. by sharing antenna 202 between multiple different wireless access protocols, e.g. by using a common RF transceiver 204 shared between multiple wireless access protocols, e.g. a common baseband modem 206 shared between multiple wireless access protocols, etc. In an exemplary aspect of disclosure, RF transceiver 204 and/or baseband modem 206 may be operated according to multiple mobile communication access protocols (i.e. "multi-mode"), and thus may be configured to support one or more of LTE, UMTS, and/or GSM access protocols.

Further to the abridged overview of operation of mobile terminal 102, RF transceiver 204 may receive radio frequency wireless signals via antenna 202, which may be implemented as e.g. a single antenna or an antenna array composed of multiple antennas. RF transceiver 204 may include various reception circuitry components, which may include analog circuitry configured to process externally received signals such as e.g. mixing circuitry to convert externally received RF signals to baseband and/or intermediate frequencies. RF transceiver 204 may also include amplification circuitry to amplify externally received signals, such as power amplifiers ("PA"s) and/or Low Noise Amplifiers ("LNA"s), although it is appreciated that such components may also be implemented separately from RF transceiver 204. RF transceiver 204 may additionally include various transmission circuitry components configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. Further references herein to reception and/or transmission of wireless signals by mobile terminal 102 may thus be understood as an interaction between antenna 202, RF transceiver 204, and baseband modem 206 as detailed above. Although not explicitly depicted in FIG. 2, RF transceiver 204 may be additionally be connected to application processor 208.

Figure 3:
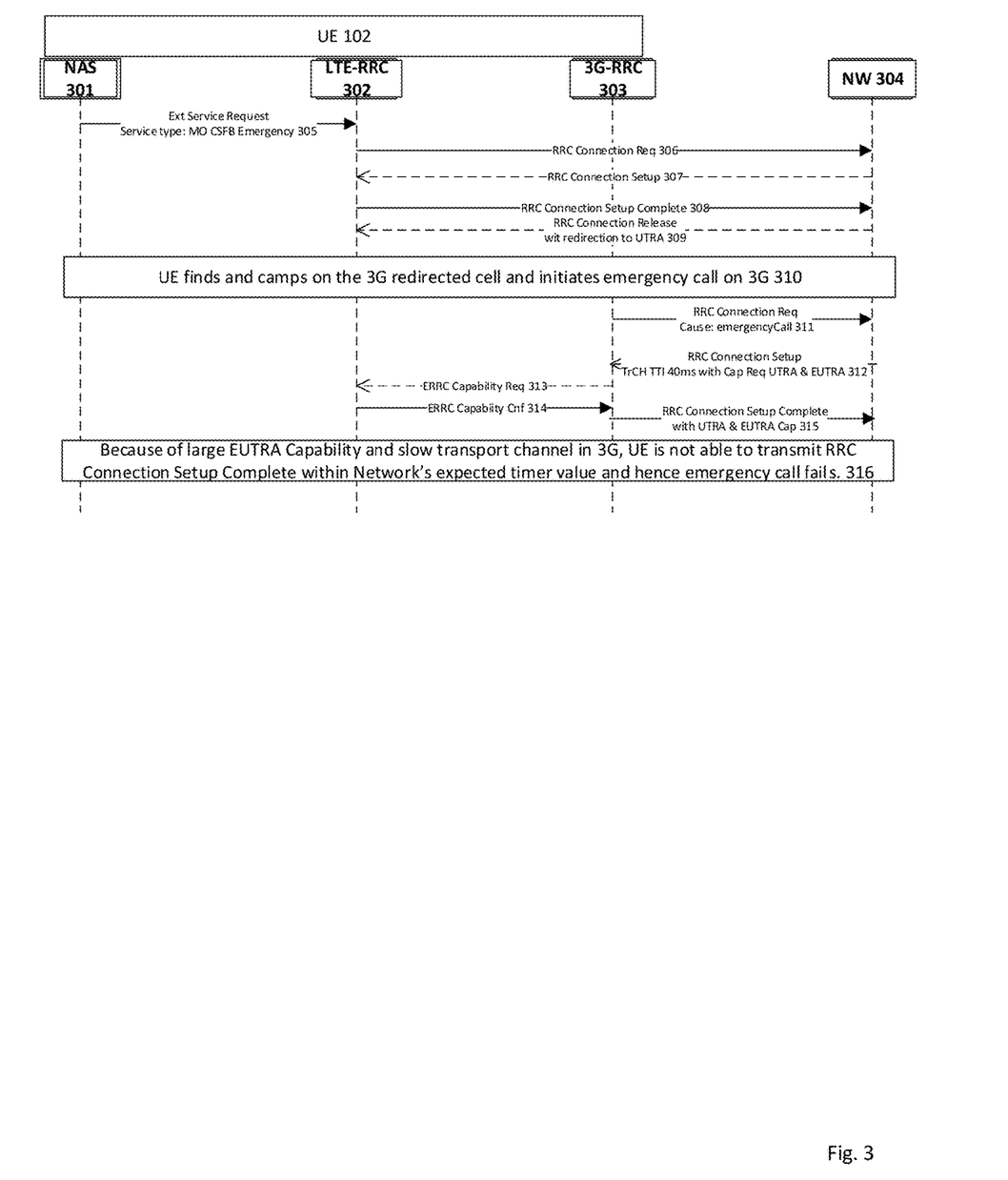
FIG. 3 shows a protocol for establishing an emergency call with carrier aggregation.

In FIG. 3, mobile terminal 102 is designated for convenience as User Equipment ("UE"), which is a term of art according to various radio access network communications standards. Wherever mobile terminal or UE are used in this disclosure, said terms are intended to be understood to be interchangeable and to be interpreted broadly, without limitation imposed by a specific radio access network standard. The Non-Access Stratum ("NAS") 301 is a functional layer between the core network and the UE. In relevant part, the NAS 301 manages the establishment of communication sessions. The NAS 301 receives and processes service requests from the mobile device. The Radio Resource Control ("RRC") is a communications layer which establishes connections and releases, broadcasts system information, establishes radio bearers, and the like. In FIG. 3, the RRC is depicted as an LTE-RRC 302 and a 3G-RRC 303. The NW 304 receives communications from, and transmits information to, the mobile device.

FIG. 3 shows an attempt to establish an emergency call that is redirected to a legacy network. As specifically shown on FIG. 3, this may be a 3G network; however, this Disclosure is not limited to 3G, and wherever the devices, method, means, and otherwise in this Disclosure assist in the establishment of an emergency call, they may be applied for that purpose. Even where a 3G NW is specifically referenced, nothing in this Disclosure should be interpreted as being limited expressly to a 3G NW. When a mobile device seeks to establish an emergency call, the NAS 301 transmits an emergency call service request, which under an exemplary mobile communication system is an Ext Service Request Service Type: MO CSFB Emergency request 305. The LTE-RRC 302 issues an RRC Connection Request 306 to the NW 304, and the NW 304 responds with a corresponding RRC Connection Setup command 307. The LTE-RRC 302 issues an RRC Connection Setup Complete command 308 to the NW 304, which responds with an RRC Connection Release and redirects the UE to the UMTS Terrestrial Radio Access ("UTRA") 309. The mobile device 102 then finds and camps on an alternative radio access network, in this case a 3G network, to initiate an emergency call 310. The 3G-RRC transmits an RRC Connection Request Cause: Emergency Call request 311 to the new NW 304, which responds with an RRC Connection Setup message, which in this exemplary response is a TrCH TTI 40 ms with Cap Req UTRA & EUTRA 312 message. The 3G-RRC transmits an ERRC Capability Req 313 message to the LTE-RRC 302, which responds with an EERC Capability Cnf 314 message. The 3G-RRC transmits an RRC Connection Setup Complete message with UTRA & EUTRA Capacity 315 to the NW 304. In this example, the mobile device supports a variety of carrier aggregation combinations, and thus the EUTRA capacity is comparatively large. As such, and in light of the comparatively slow transport channel assigned to this exchange, the mobile device is not able to transmit the RRC Connection Setup Complete message within the NW's 304 expected timer value, which results in call failure 316.

Figure 4:
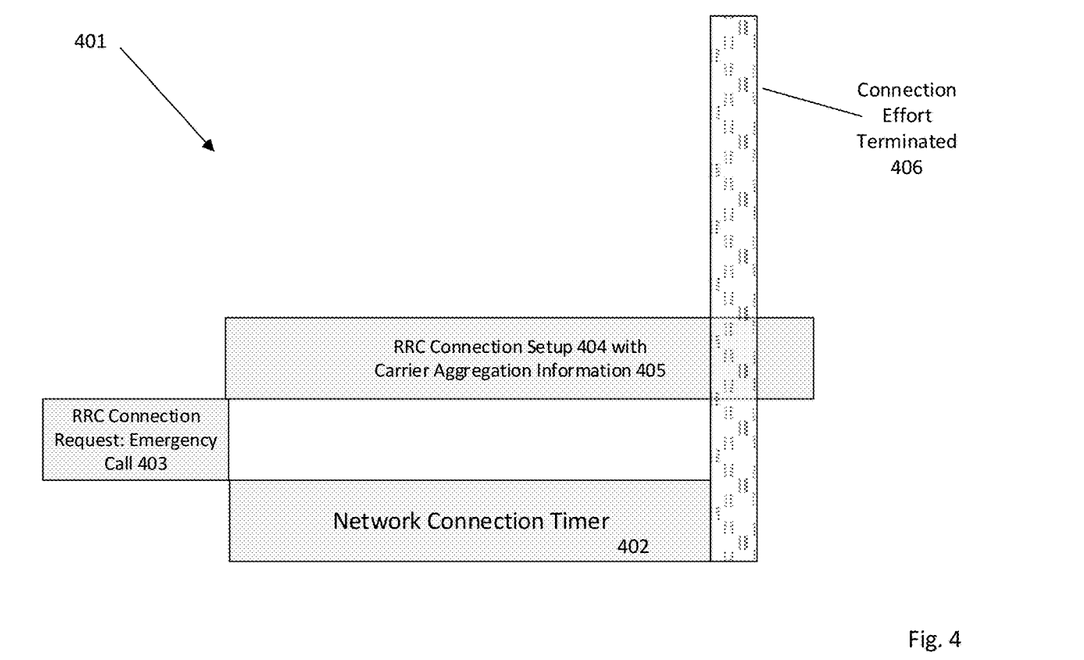
FIG. 4 shows carrier aggregation information preventing establishment of an emergency call.

FIG. 4 shows a simplified graphical depiction of transmitting carrier aggregation data during emergency call setup 401. In FIG. 4, the mobile device has been directed to a legacy RAT for establishment of an emergency call. After receiving the RRC Connection Request, the NW begins a Network Connection Timer 402, which sets a durational limit for the establishment of a call. In this case, the Network Connection Timer 402 limits the time to establish an emergency call. The Network Connection Timer 402 and its duration are typically set by the NW on which the call is being attempted. The mobile device issues an RRC Connection Request for an Emergency Call 403, which causes the NW to initiate the Network Connection Timer 402. The RRC Connection Setup 404 command is transmitted. To establish the call, the mobile device will generally transmit its UTRA & EUTRA capabilities, which includes carrier aggregation information 405. Because the carrier aggregation data may be comparatively voluminous, and particularly given that a slow transport channel is typically assigned to emergency calls, it may be impossible to transmit the UE Capability Information, which includes the Carrier Aggregation Information 405 to the NW within the time allotted by the Network Connection Timer 402. Where the Network Connection Timer 402 expires before the transmission of the UE Capability Information, including the Carrier Aggregation Information 405, and thus the call is not yet established at the conclusion of the Network Connection Timer 402, the Connection Effort is terminated 406 and the emergency call will fail. It is expressly noted that the transmission information in FIG. 4 is depicted generically for demonstrative purposes and is not intended to be limiting. For example, because the UE Capability Information, including the Carrier Aggregation Information 405 is actually piggybacked into the RRC Connection Setup Complete message in 3G, these two transmission are depicted jointly in a single transmission block 405 in this figure. This is not intended to exclude a RAT configuration that may require the Carrier Aggregation Information to be sent separately from the RRC Connection Request.

Figure 5:
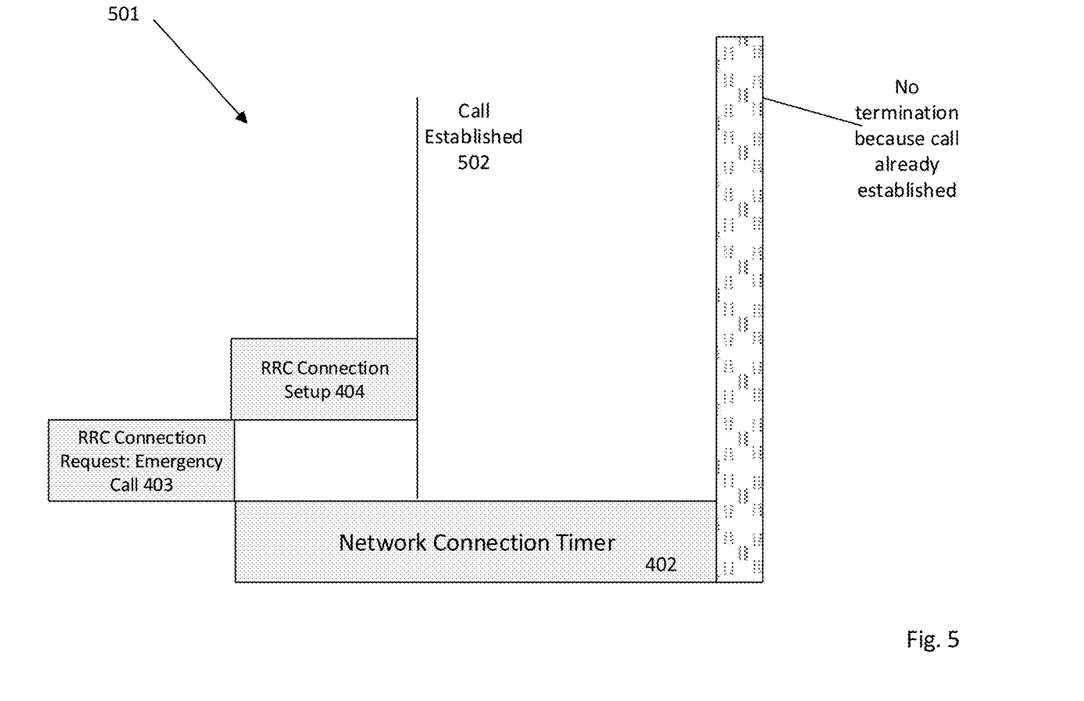
FIG. 5 shows a successful emergency call with truncated setup information.

FIG. 5 shows a simplified visual depiction of establishing an emergency call, wherein the Carrier Aggregation Information 405 is omitted, thereby permitting the emergency call to be established 501. As in the prior example, the emergency call must be established within the duration of the Network Connection Timer 402. In this case, the mobile device issues an RRC Connection Request for an Emergency Call 403, and the RRC Connection Setup command 404 is transmitted; however, the mobile device omits the Carrier Aggregation Information 405, which results in a reduced volume of data to transmit for call establishment. In this case, due to the reduced volume on account of the omission of the Carrier Aggregation Information 405, the call establishment data is successfully transmitted before the expiration of the Network Connection Timer 402. Thus, the failure of an emergency call may be avoided by omitting the transmission of UE supported Carrier Aggregation Information 405. Once again, the joint depiction of Carrier Aggregation Information and RRC Connection Setup Complete message is not intended to limit application of this principle to any specific RAT, or to exclude any RAT that may otherwise arrange this information.

Figure 6:
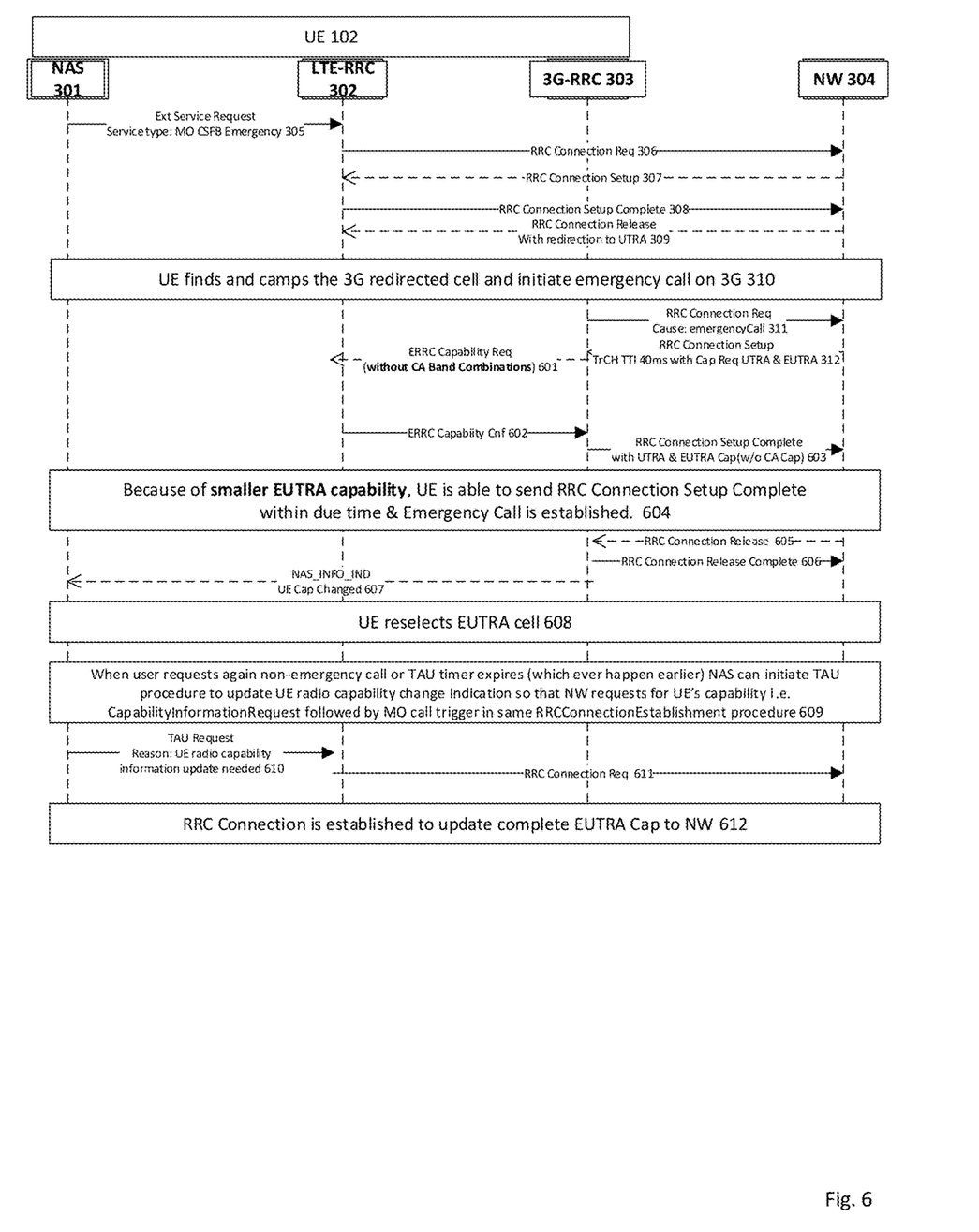
FIG. 6 shows emergency call set up without carrier aggregation information.

FIG. 6 shows an attempt to establish an emergency call on a legacy network, wherein Carrier Aggregation Information is omitted in the emergency call establishment procedure. Under this method, when a mobile device seeks to establish an emergency call, the NAS 301 transmits an emergency call service request, which under an exemplary mobile communication system is an Ext Service Request Service Type: MO CSFB Emergency request 305. The LTE-RRC 302 issues an RRC Connection Request 306 to the NW 304, and the NW 304 responds with a corresponding RRC Connection Setup command 307. The LTE-RRC 302 issues an RRC Connection Setup Complete command 308 to the NW 304, which responds with an RRC Connection Release and redirection to the UTRA 309. The mobile device 102 then finds and camps on an alternative radio access network, in this case a 3G network, to initiate an emergency call 310. The 3G-RRC transmits an RRC Connection Request Cause: Emergency Call request 311 to the new NW 304, which responds with an RRC Connection Setup message, which in this exemplary response is a TrCH TTI 40 ms with Cap Req UTRA & EUTRA 312 message. It is expressly noted, however, that the 40 ms transport channel in this example is demonstrative only and is not intended to limit the disclosure to scenarios where a 40 ms channel is proposed. As will be described in greater detail, transport channels for emergency calls tend to be slower than transport channels for non-emergency calls, and although the example of 40 ms is used herein, the actual speed of the proffered transport channel is secondary to the truncation of data described herein, such that transmission may be achieved within a shorter period than would otherwise be possible. In contrast to the procedure described in FIG. 3, however, in this procedure, the 3G-RRC 303 transmits to the LTE-RRC 302 an ERRC Capability Request without Carrier Aggregation Band Combinations 601. The LTE-RRC 302 responds with the corresponding ERRC Capability Information 602. The 3G-RRC 303 then transmits an RRC Connection Setup Complete command with the corresponding UTRA & EUTRA capabilities 603; however, since the corresponding UTRA & EUTRA capabilities were obtained in response to command 601, which requested said capabilities without Carrier Aggregation Band Combinations, the transmission of 603 similarly omits Carrier Aggregation Band Combinations, which results in a smaller EUTRA capability transmission. Because of the smaller EUTRA capability transmission, the mobile device is able to send the RRC Connection Setup Complete command within the time allotted by the Network Connection Timer, and the call is successfully established.

FIG. 6 further shows a procedure for updating the Carrier Aggregation Information 405 following the placement of the emergency call. Because the emergency call is initiated without transmission of Carrier Aggregation Information 405, the mobile device cannot take advantage of carrier aggregation during the emergency call. It is therefore beneficial to include a procedure to reestablish the ability to perform carrier aggregation following the emergency call. One advantageous means to resume carrier aggregation capability is to initiate a Tracking Area Update ("TAU") procedure. In greater detail, and once the emergency call is complete, the NW 304 issues an RRC Connection Release 605 command, and the 3G-RRC 303 issues an RRC Connection Release Complete Command 606. The 3G-RRC 303 then sends a command to the NAS 301 that the mobile device's channel aggregation capacity has changed. An exemplary command according to one possible RAT is NAS_INFO_IND UE Cap Changed command 607. The mobile device will reselect a cell post RRC Connection Release, which may be a EUTRA cell 608. With the establishment of a connection to a EUTRA cell for a non-emergency call, the mobile device can initiate a TAU procedure to update the NW that UE's carrier aggregation capabilities have changed. For example, and according to an exemplary command set, when a mobile device requests a non-emergency call, the NAS can initiate a TAU procedure to update the mobile device's radio capability channel indication. In so doing, the network requests CapabilityInformationRequest followed by an MI call trigger in the same RRCConnectionReq 609. As shown in FIG. 6, the NAS issues a TAU Request Reason: UE Radio Capability Information Update Needed 610, which is transmitted to the NW in an RRC Connection Request 611. The RRC Connection is then established to update complete EUTRA capabilities to the NW 612.

Figure 7:
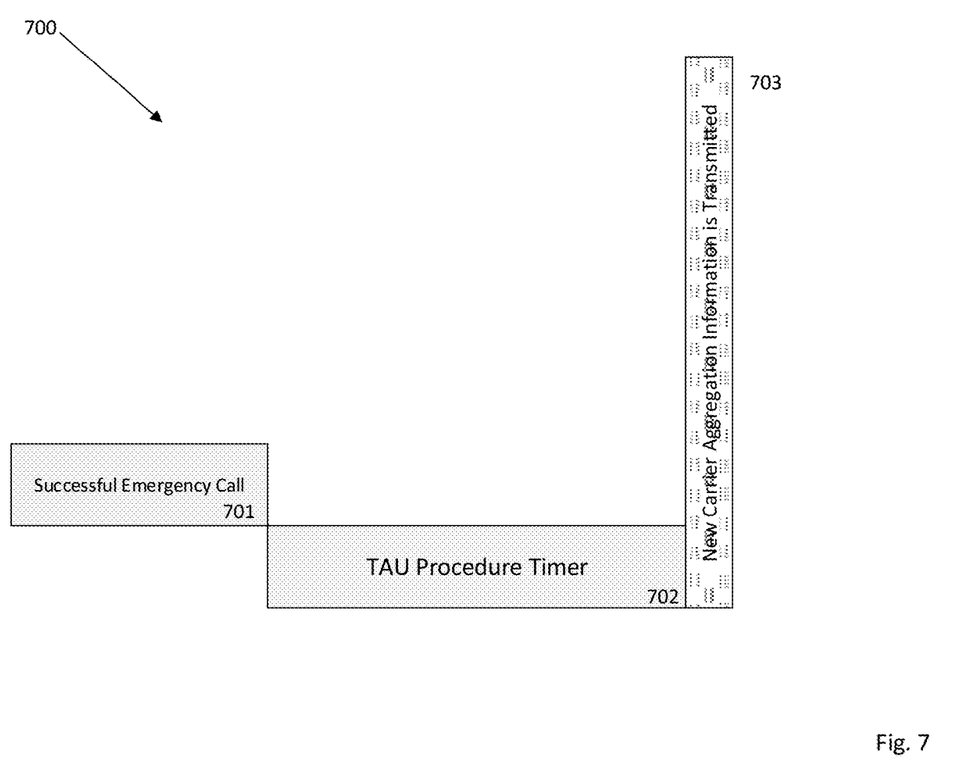
FIG. 7 shows a tracking area update procedure triggered by an optional timer.

FIG. 7 shows an alternative method of updating the EUTRA capabilities including carrier aggregation information, according to one aspect of the Disclosure 700. Upon completion of an emergency call 701, the mobile device initiates a TAU Procedure Timer 702, which initiates a TAU procedure upon a predetermined time following completion of an emergency call. After expiration of the timer, the mobile device transmits the new carrier aggregation information 703. Thus, the TAU procedure is initiated and carrier aggregation information is updated before the next attempt at initiating a non-emergency call.

Figure 8:
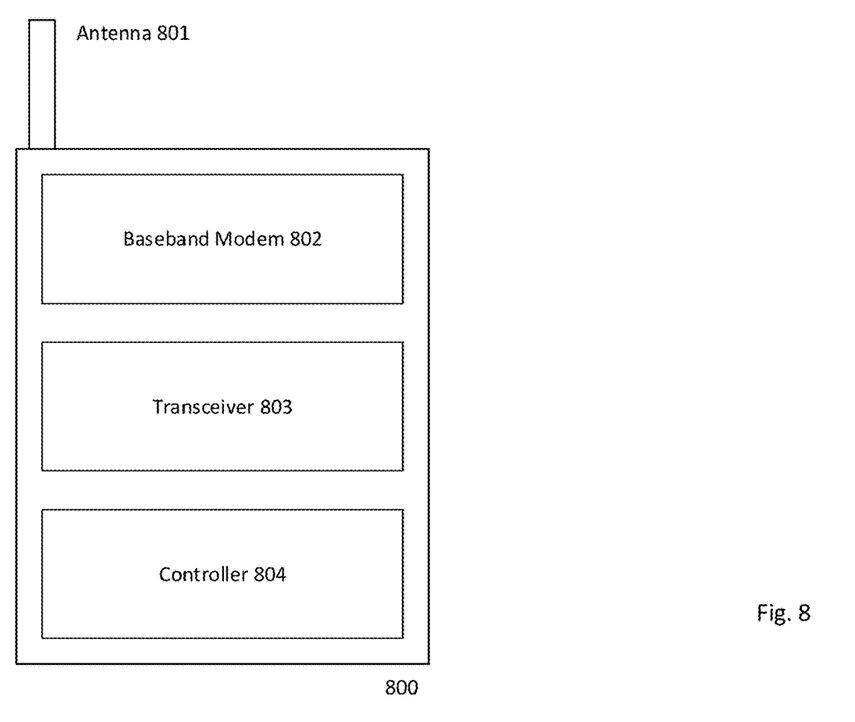
FIG. 8 shows a device for an emergency call on a radio access network.

FIG. 8 shows a device for placing an emergency call on a radio access network 800 including an antenna 801, a baseband modem 802, a transceiver 803, and a controller 804. The baseband modem 802 is configured to wirelessly communicate a signal; the transceiver 803 is configured to establish a wireless connection with a network; the antenna 801 is configured to transmit a radio frequency signal; and the controller 804 is configured to establish a wireless voice call. The transceiver 803 transmits a connection request for an emergency voice call and a limited channel capability information to the radio access network, wherein the limited channel capability information excludes carrier aggregation band combinations; and wherein the controller requests a tracking area update procedure.

Figure 9:
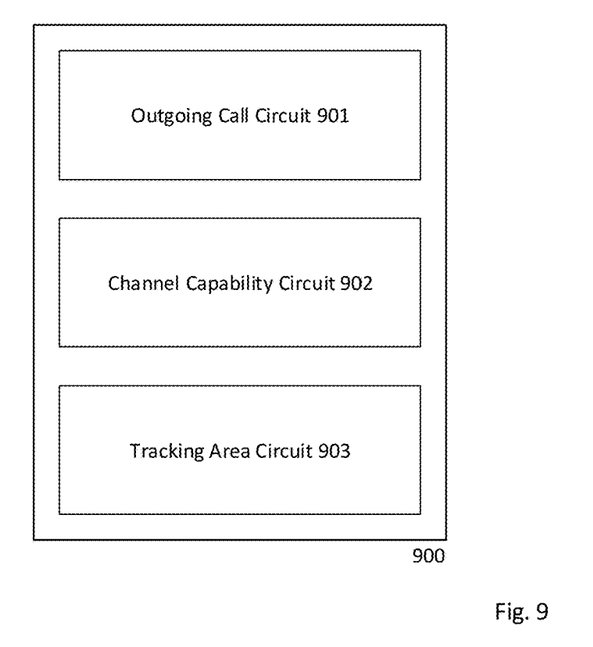
FIG. 9 shows a circuit configuration for making an emergency call on a radio access network.

FIG. 9 shows a circuit configuration for placing an emergency call on a radio access network 900 including an Outgoing Call Circuit 901, a Channel Capability Circuit 902, and a Tracking Area Circuit 903, wherein the outgoing call circuit 901 establishes an outgoing emergency call; the channel capability circuit 902 transmits limited channel capability information to the radio access network, wherein the limited channel capability information excludes carrier aggregation band combinations; and the tracking area circuit 903 transmits a request for a tracking area update procedure.

Figure 10:
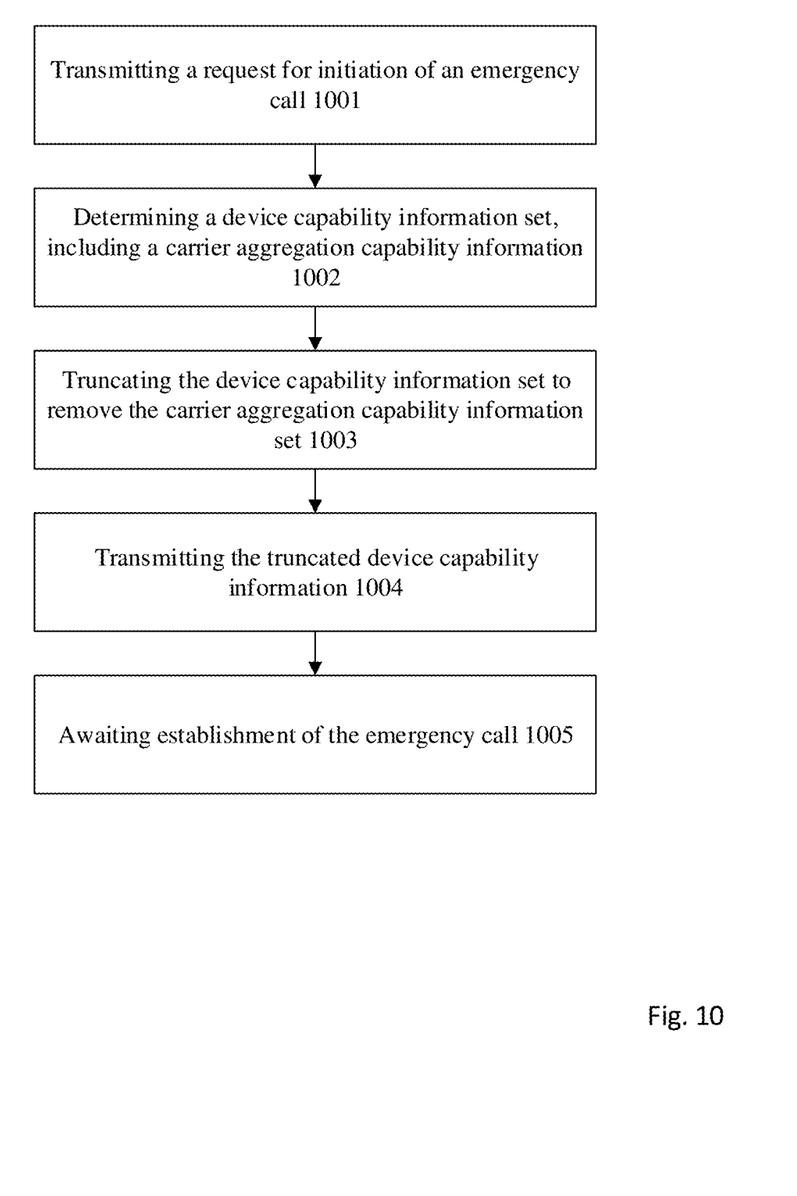
FIG. 10 shows a method for making an emergency call on a radio access network.

FIG. 10 shows a method of using a mobile device to perform an emergency call on a radio access network including transmitting a request for initiation of an emergency call 1001; determining a device capability information set, including a carrier aggregation capability information 1002; truncating the device capability information set to remove the carrier aggregation capability information 1003; transmitting the truncated device capability information set 1004; and awaiting establishment of the emergency call 1005.

In establishing a NW connection, the mobile device generally transmits UTRA and/or EUTRA capability information ("Capability Information") to the NW, as requested by NW. The Capability Information includes several aspects, including, but not limited to, mobile device category, feature group indicators, and carrier aggregation information. Owing to the increasing advances in mobile device technology, the Capability Information transmission is increasingly lengthy. The Capability Information can be the lengthiest part of the call establishment transmission.

Although carrier aggregation can be extremely useful, successful implementation of carrier aggregation requires a lengthy transmission of the mobile device's supported carriers and supported carrier combinations. Depending on the number of carriers and combinations, this transmission can be lengthy and may in fact be the lengthiest portion of the Capability Information. As described above, the difficulty of transmitting the Capability Information for emergency call establishment, particularly in light of the comparatively slow transport channel generally assigned to emergency calls, can result in failed attempts at emergency call establishment. This may be vexing for a user attempting to place an emergency call, and in light of the comparatively great importance of an emergency call, it is generally undesirable for emergency calls to be unavailable or unlikely to succeed. Thus, actions to increase the likelihood of successful establishing an emergency call, or even action to result in a more rapid establishment of an emergency call, may be beneficial.

One way to improve the likelihood of success in establishing an emergency call is to shorten the Capability Information, such that the Capability Information may be completely transmitted before expiration of the Network Connection Timer. Where an emergency call is placed on certain Radio Access Networks, such as, for example, a 3G Network, carrier aggregation may be unsupported, and thus there is little or no benefit in transmitting this information. As such, eliminating the carrier aggregation information from the emergency call establishment can shorten the Capability Information, and thus increase the chances of successfully establishing the call, without any appreciable disadvantage.

According to one aspect of the Disclosure, carrier aggregation information can be omitted from the Capability Information for emergency call establishment on a 3G Network. As stated above, carrier aggregation information is currently only useful for LTE/4G networks, and therefore the transmission of carrier aggregation information, while route in call establishment, serves little purpose. As such, elimination of carrier aggregation information for emergency calls on 3G networks can reduce the length of the Capability Information and increase the likelihood of a successful emergency call establishment before expiration of the Network Connection Timer.

According to another aspect of the Disclosure, the benefits of eliminating carrier aggregation information from the Capability Information are not limited to 3G Networks. For example, large Capability Information messages may lead to high setup times for emergency calls, or even failure of emergency calls, in a 4G RAT. Thus, the procedure of eliminating carrier aggregation information during emergency call setup described herein provides at least two benefits. First, this procedure allows for the establishment of emergency calls that would otherwise be unlikely or impossible due to the challenge of transmitting the carrier aggregation information on a comparatively slow transmit channel within a predetermined time limit. Second, this procedure allows for more rapid establishment of emergency calls, whether on a 3G network, 4G network, or otherwise. The removal of carrier aggregation information reduces the volume of data necessary for emergency call establishment, which in turn results in more rapid call establishment. Due to the nature of emergency calls, more rapid call establishment is viewed as desirable.

According to one aspect of the Disclosure, carrier aggregation information can be omitted from the Capability Information for emergency call establishment on any network where carrier aggregation is not supported. The benefits of this Disclosure are not limited to 3G networks and can be realized in any network without carrier aggregation support or where carrier aggregation is not used during emergency call.

Upon completion of the emergency call, the mobile device may be unable to take advantage of carrier aggregation, given that the carrier aggregation capability information was omitted from the device capability information and thus not transmitted to the network. As such, it is advantageous to reestablish carrier aggregation capability following the conclusion of the emergency call. One way to ensure reestablishment of carrier aggregation capability is to request a tracking area update. The tracking area update informs the network that the mobile device's capabilities have changed and introduces a new opportunity to update the mobile device's capability settings. Upon initiating a tracking area update, the mobile device may transmit its carrier aggregation settings. Assuming that the network supports carrier aggregation, this is likely to permit carrier aggregation in future calls.

Various times can be selected for initiation of the tracking area update procedure. According to one aspect of the Disclosure, the tracking area update procedure can be initiated immediately upon or rapidly after conclusion of the emergency call. According to another aspect of the Disclosure, the tracking area procedure may be initiated upon initiation of a next non-emergency call.

According to another aspect of the Disclosure, the mobile device may be equipment with a tracking area update timer to request the tracking area update at a predetermined length of time after conclusion of the emergency call. This tracking area update timer may be set for a length of time, after which the mobile device will initiate the tracking area update procedure. According to one aspect of the Disclosure, the predetermined length of time is 20 minutes. According to another aspect of the Disclosure, the predetermined length of time is 60 minutes. According to yet another aspect of the Disclosure, the predetermined length of time may be any amount of time following the conclusion of the emergency call.

According to one aspect of the Disclosure, the emergency call may be placed on a 3rd Generation Wireless Mobile Technology Network. Because carrier aggregation information is only useful for LTE/4G network, carrier aggregation information is selected for omission from the call establishment procedure, as the omission would not be expected to result in a disadvantageous effect on the resulting call. According to another aspect of the Disclosure, however, the omission of carrier aggregation information described herein is not limited to use on a third generation network, but rather can be employed on any RAT, whether a legacy RAT or otherwise.

The omission of carrier aggregation information described herein is especially relevant for emergency calls due to the transport channels typically used for this purpose. When a mobile device attempts to establish an emergency call, the device will be assigned a transport channel for transmission of information, including, but not limited to, device capability information. Transport channels may be of varying speeds. Emergency calls are typically assigned comparatively slow transport channels, compared to non-emergency calls. For example, a transport channel for non-emergency calls on the 3rd Generation Wireless Mobile Technology Network may be a 10 ms channel or a 20 ms channel, but a transport channel for emergency calls on the same network may be a 40 ms transport channel. As a demonstration of the result of these differences, a 40 ms transport channel may be four times slower than a 10 ms channel.

This disclosure refers generally to the information regarding the features and capabilities of the mobile device as device capability information. According to one aspect of the Disclosure, the device capability information may be UTRA capability information or EUTRA capability information. Nevertheless, this is not intended to be limiting to UTRA or EUTRA information, as the principles described herein are expected to apply under future standards.

Networks are generally equipped with a Network Connection Timer, which limits the time permitted for establishment of a wireless connection, such as, in this case, an emergency voice call. The Network Connection Timer is typically set to a determined length of time, which is controlled by the network. This Network Connection Timer can be set to any length of time by the network, without restriction. According to one aspect of the Disclosure, the Network Connection Timer can be set to 1.5 seconds or 3 seconds; however, these examples are intended to be demonstrative rather than limiting. If an emergency call is not established by the expiration of the Network Connection Timer, the call will fail. Thus, a mobile device seeking to establish an emergency call must transmit some amount of device capability data, on a comparatively slow transport channel, in a limited period of time. Because the mobile device generally cannot influence the speed of the transport channel or the length of the Network Connection Timer, the procedure of truncating the device capability information described herein is an effort to change the variable that is within the purview of the mobile device, such that the chances of successfully establishing an emergency call is increased.

The truncated device capability data omits carrier aggregation information. This may include one or more carriers supported by the mobile device; one or more combinations of carriers supported by the mobile device; or both.

The methods disclosed herein may be carried out by at least a device or a circuit configuration. It is further disclosed herein a device for making an emergency call on a radio access network including a baseband modem, configured to prepare a signal for transmission; a transceiver, configured to transmit information; an antenna, configured to wirelessly send transmitted data; and a controller, configured to establish a wireless call; wherein the transceiver transmits a request for initiation of an emergency call; wherein the controller determines a device capability information set, including a carrier aggregation capability information; truncates the device capability information set to remove the carrier aggregation capability information; causes the transceiver to transmit the truncated device capability information; and awaits establishment of the emergency call.

The above-disclosed device may further include the controller being configured to request a tracking area update. This tracking area update may be requested in any of the ways described for the method of making an emergency call disclosed above, including, but not limited to, requesting the tracking area update upon conclusion of the emergency call; requesting the tracking area update upon initiation of the next non-emergency call; or pursuant to a tracking area update timer, which requests the tracking area update upon expiration of the timer. The timer may be set for a predetermined period of time, which can be any length of time, whether ten minutes, twenty minutes, thirty minutes, one hour, a range from ten minutes to one hour, or otherwise.

It is further disclosed herein a means for performing an emergency call on a radio access network including an outgoing call circuit, for the establishment of an outgoing emergency call; a channel capability circuit, for determining a device capability information set, including a carrier aggregation capability information; truncating the device capability information set to remove the carrier aggregation capability information; and transmitting the truncated device capability information set; and a tracking area circuit, for transmit a request for a tracking area update procedure.

The following examples are provided as further aspects of the Disclosure.

In example 1, a method of using a mobile device to perform an emergency call on a radio access network is disclosed, including:
transmitting a request for initiation of an emergency call;
determining a device capability information set, including a carrier aggregation capability information;
truncating the device capability information set to remove the carrier aggregation capability information;
transmitting the truncated device capability information set; and
awaiting establishment of the emergency call.

In example 2, the method of example 1 is disclosed, further including requesting a tracking area update.

In example 3, the method of example 2 is disclosed, further including requesting the tracking area update procedure upon conclusion of the emergency call.

In example 4, the method of example 2 is disclosed, further including requesting the tracking area update procedure upon initiation of a next non-emergency call.

In example 5, the method of example 2 is disclosed, further including a tracking area update timer to define a predetermined length of time after conclusion of the emergency call to request the tracking area update.

In example 6, the method of example 5 is disclosed, wherein the predetermined length of time is a range from 10 to 30 minutes.

In example 7, the method of example 5 is disclosed, wherein the predetermined length of time is 20 minutes.

In example 8, the method of example 5 is disclosed, wherein the predetermined length of time is 60 minutes.

In example 9, the method of any one of examples 1 to 8 is disclosed, further including establishing the wireless call on a 3rd Generation Wireless Mobile Technology Network.

In example 10, the method of example 9 is disclosed, wherein the 3rd Generation Wireless Mobile Technology Network assigns a slower transport channel to emergency calls than non-emergency calls.

In example 11, the method of example 9 is disclosed, wherein the transport channel for non-emergency calls on the 3rd Generation Wireless Mobile Technology Network is a 10 ms channel.

In example 12, the method of example 9 is disclosed, wherein the transport channel for non-emergency calls on the 3rd Generation Wireless Mobile Technology Network is a 20 ms channel.

In example 13, the method of any one of examples 10 to 12 is disclosed, wherein the transport channel for emergency calls on the 3rd Generation Wireless Mobile Technology Network is a 40 ms transport channel.

In example 14, the method of any one of examples 1 to 8 is disclosed, further including establishing the wireless call on a 4th Generation Wireless Mobile Technology Network.

In example 15, the method of example 14 is disclosed, wherein truncating the device capability information set to remove the carrier aggregation capability information reduces a time for emergency call establishment.

In example 16, the method of any one of examples 1 to 15 is disclosed, wherein the truncated device capability information includes Universal Mobile Telecommunications System Terrestrial Radio Access capability information or evolved Universal Mobile Telecommunications System Terrestrial Radio Access capability information.

In example 17, the method of example 16 is disclosed, wherein a reduced size of the Universal Mobile Telecommunications System Terrestrial Radio Access capability information or evolved Universal Mobile Telecommunications System Terrestrial Radio Access capability information permits transmission within a threshold permitted by a network call establishment timer.

In example 18, the method of any one of examples 1 to 17 is disclosed, wherein the network call establishment timer has a predetermined length of 1.5 seconds.

In example 19, the method of any one of examples 1 to 17 is disclosed, wherein the network call establishment timer has a predetermined length of 3 seconds.

In example 20, the method of any one of examples 1 to 17 is disclosed, wherein the network call establishment timer has a predetermined length of 1 to 10 seconds.

In example 21, the method of any one of examples 1 to 20 is disclosed, wherein the emergency call is stopped if it is not completed within a predefined time period provided by a network call establishment timer.

In example 22, the method of any one of examples 1 to 21 is disclosed, wherein the carrier aggregation capability information includes carriers supported by the mobile device.

In example 23, the method of any one of examples 1 to 22 is disclosed, wherein the carrier aggregation capability information includes combinations of carriers supported by the mobile device.

In example 24, the method of any one of examples 1 to 23 is disclosed, wherein the carrier aggregation capability information includes carriers supported by the mobile device and combinations of carriers supported by the mobile device.

In example 25, a device for making an emergency call on a radio access network is disclosed, including:
a controller, configured to generate a request for initiation of an emergency call;
a transceiver, configured to transmit the request for initiation of an emergency call;
wherein the controller is further configured to determine a device capability information set,
including a carrier aggregation capability information, to truncate the device capability information set to remove the carrier aggregation capability information, to control the transceiver to transmit the truncated device capability information, and to await establishment of the emergency call.

In example 26, the device of example 25 is disclosed, further including the controller being configured to request a tracking area update.

In example 27, the device of example 26 is disclosed, further including the controller requesting the tracking area update upon conclusion of the emergency call.

In example 28, the device of example 26 is disclosed, further including the controller requesting the tracking area update upon initiation of the next non-emergency call.

In example 29, the device of example 26 is disclosed, further including a tracking area update timer to determine a time to request the tracking area update.

In example 30, the device of example 29 is disclosed, wherein the tracking area update timer requests the tracking area update 20 minutes after termination of the emergency call.

In example 31, the device of example 29 is disclosed, wherein the tracking area update timer requests the tracking area update 30 minutes after termination of the emergency call.

In example 32, the device of example 29 is disclosed, wherein the tracking area update timer requests the tracking area update 60 minutes after termination of the emergency call.

In example 33, the device of example 29 is disclosed, wherein the tracking area update timer requests the tracking area update 1 to 30 minutes after termination of the emergency call.

In example 34, the device of any one of examples 25 to 33 is disclosed, further including the device transmitting on a 3rd Generation Wireless Mobile Technology Network.

In example 35, the device of any one of examples 25 to 34 is disclosed, wherein the truncated device capability information includes Universal Mobile Telecommunications System Terrestrial Radio Access capability information or evolved Universal Mobile Telecommunications System Terrestrial Radio Access capability information In example 36, a circuit configuration for a mobile device for performing an emergency call on a radio access network is disclosed, including:
a call initiation circuit, configured to transmit a request for initiation of an emergency call;
determining circuit, configured to determining a device capability information set, including a carrier aggregation capability information, and to truncate the device capability information set to remove the carrier aggregation capability information;
a communications circuit, configured to transmit the truncated device capability information set and to await establishment of the emergency call.

In example 37, a means for performing an emergency call on a radio access network is disclosed, including:
an outgoing call initiator, for the establishment of an outgoing emergency call;
a channel capability determiner, for determining a device capability information set, including
a carrier aggregation capability information; truncating the device capability information set to remove the carrier aggregation capability information; and transmitting the truncated device capability information set; and
a tracking area updater, for transmit a request for a tracking area update procedure.

In example 38, a non-transitory computer readable medium, including software, configured to perform any of the above methods for performing an emergency call on a radio access network is disclosed.

In example 39, a machine readable medium including code, when executed, to cause a machine to perform the method of any one of examples 1 through 24 is disclosed.

In example 40, machine-readable storage including machine-readable instructions, when executed, to implement a method or realize an apparatus as described in any preceding example are disclosed.

In example 41, an apparatus including means to perform a method as described in any preceding example is disclosed.

In Example 42, the method of Example 1 is disclosed, wherein the elimination of carrier aggregation capability information results in faster emergency call establishment compared to an emergency call where carrier aggregation information is transmitted.

In Example 43, the method of Example 37 is disclosed, wherein the faster emergency call establishment occurs on a 4G network.

The invention claimed is:

1. A method of using a mobile device to perform an emergency call on a radio access network comprising:
transmitting a request for initiation of an emergency call to a network device; determining a device capability information set, including a carrier aggregation capability information;
truncating the device capability information set to remove the carrier aggregation capability information;
transmitting the truncated device capability information set to the network device; and
awaiting establishment of the emergency call; and
requesting a tracking area update;
wherein requesting the tracking area update comprises requesting the tracking area update based on conclusion of the emergency call; requesting the tracking area update procedure upon initiation of a next non-emergency call; or setting a tracking area update timer to define a predetermined length of time after conclusion of the emergency call to request the tracking area update.

2. The method of claim 1, further comprising requesting the tracking area update procedure upon conclusion of the emergency call.

3. The method of claim 1, further comprising requesting the tracking area update procedure upon initiation of a next non-emergency call.

4. The method of claim 1, further comprising a tracking area update timer to define a predetermined length of time after conclusion of the emergency call to request the tracking area update.

5. The method of claim 4, wherein the predetermined length of time is a range from 10 to 30 minutes.

6. The method of claim 1, further comprising establishing the emergency call on a 3rd Generation Wireless Mobile Technology Network.

7. The method of claim 1, further comprising establishing the emergency call on a 4th Generation Wireless Mobile Technology Network.

8. The method of claim 1, wherein the truncated device capability information comprises Universal Mobile Telecommunications System Terrestrial Radio Access capability information or evolved Universal Mobile Telecommunications System Terrestrial Radio Access capability information.

9. The method of claim 8, wherein a reduced size of the Universal Mobile Telecommunications System Terrestrial Radio Access capability information or evolved Universal Mobile Telecommunications System Terrestrial Radio Access capability information permits transmission within a threshold permitted by a network call establishment timer.

10. The method of claim 1, wherein the emergency call is stopped if it is not established within a predefined time period provided by a network call establishment timer.

11. The method of using a mobile device to perform an emergency call of claim 1, wherein the truncated device capability information set that is transmitted does not include the carrier aggregation capability information.

12. A device for making an emergency call on a radio access network comprising:
- a controller, configured to generate a request for initiation of an emergency call;
- a transceiver, configured to transmit the request for initiation of an emergency call to a network device; and
- wherein the controller is further configured to determine a device capability information set, including a carrier aggregation capability information, truncate the device capability information set to remove the carrier aggregation capability information, control the transceiver to transmit the truncated device capability information to the network device, await establishment of the emergency call;
- and request a tracking area update;
- wherein requesting the tracking area update comprises requesting the tracking area update based on conclusion of the emergency call; requesting the tracking area update procedure upon initiation of a next non-emergency call; or setting a tracking area update timer to define a predetermined length of time after conclusion of the emergency call to request the tracking area update.

13. The device of claim 12, further comprising the controller requesting the tracking area update upon conclusion of the emergency call.

14. The device of claim 12, further comprising the controller requesting the tracking area update upon initiation of a next non-emergency call.

15. The device of claim 12, further comprising a tracking area update timer to determine a time to request the tracking area update.

16. The device of claim 15, wherein the tracking area update timer requests the tracking area update 1 to 30 minutes after termination of the emergency call.

17. The device of claim 12, further comprising the device transmitting on a 3rd Generation Wireless Mobile Technology Network.

18. The device of claim 12, wherein the truncated device capability information comprises Universal Mobile Telecommunications System Terrestrial Radio Access capability information or evolved Universal Mobile Telecommunications System Terrestrial Radio Access capability information.

* * * * *